United States Patent [19]

Bachmann et al.

[11] Patent Number: 5,145,509
[45] Date of Patent: * Sep. 8, 1992

[54] METHOD OF MANUFACTURING OPTICAL FIBRES

[75] Inventors: Peter K. Bachmann; Hans-Jürgen E. Hagemann, both of Aachen, Fed. Rep. of Germany; Jacques P. M. Warnier, Eijsden, Netherlands; Howard J. C. Wilson, Aachen, Fed. Rep. of Germany

[73] Assignee: U.S. Philips Corp., New York, N.Y.

[*] Notice: The portion of the term of this patent subsequent to Oct. 3, 2006 has been disclaimed.

[21] Appl. No.: 779,117

[22] Filed: Oct. 15, 1991

Related U.S. Application Data

[63] Continuation of Ser. No. 528,289, Apr. 25, 1990, abandoned, which is a continuation of Ser. No. 206,557, Jun. 14, 1988, abandoned.

[30] Foreign Application Priority Data

Jun. 16, 1987 [DE] Fed. Rep. of Germany ....... 3720030

[51] Int. Cl.$^5$ ............................................ C03B 37/018
[52] U.S. Cl. ..................... 65/3.12; 65/18.2; 427/38; 427/163; 427/237; 427/167
[58] Field of Search ................... 65/3.12, 18.2; 427/38, 427/39, 163, 167, 237

[56] References Cited

U.S. PATENT DOCUMENTS

| | | | |
|---|---|---|---|
| 4,263,032 | 4/1981 | Sinclair | 65/3.12 |
| 4,417,911 | 11/1983 | Cundy | 65/3.12 |
| 4,741,747 | 5/1988 | Geittner | 65/3.12 |
| 4,871,383 | 10/1989 | Bachmann | 65/3.12 |

FOREIGN PATENT DOCUMENTS 2079267 1/1982 United Kingdom ................ 65/3.12

Primary Examiner—Kenneth M. Schor
Attorney, Agent, or Firm—Ernestine C. Bartlett

[57] ABSTRACT

In the manufacture of optical fibers according to the PCVD method, a method is provided wherein the yield of the method ($\eta$), in particular at increased deposition rates (m), is raised by reducing the geometrical taper, without forming optical tapers. This is obtained in that glass is deposited in layers on the inside of a glass tube and, simultaneously, on a glass rod having a circular cross-section, which rod is arranged inside the glass tube, such that its longitudinal axis coincides with that of the glass tube, the radius of the glass rod being adjusted to at most 0.67 times and at least 0.2 times the inner radius of the glass tube, and the glass rod being removed from the glass tube upon completion of the deposition process.

2 Claims, 1 Drawing Sheet

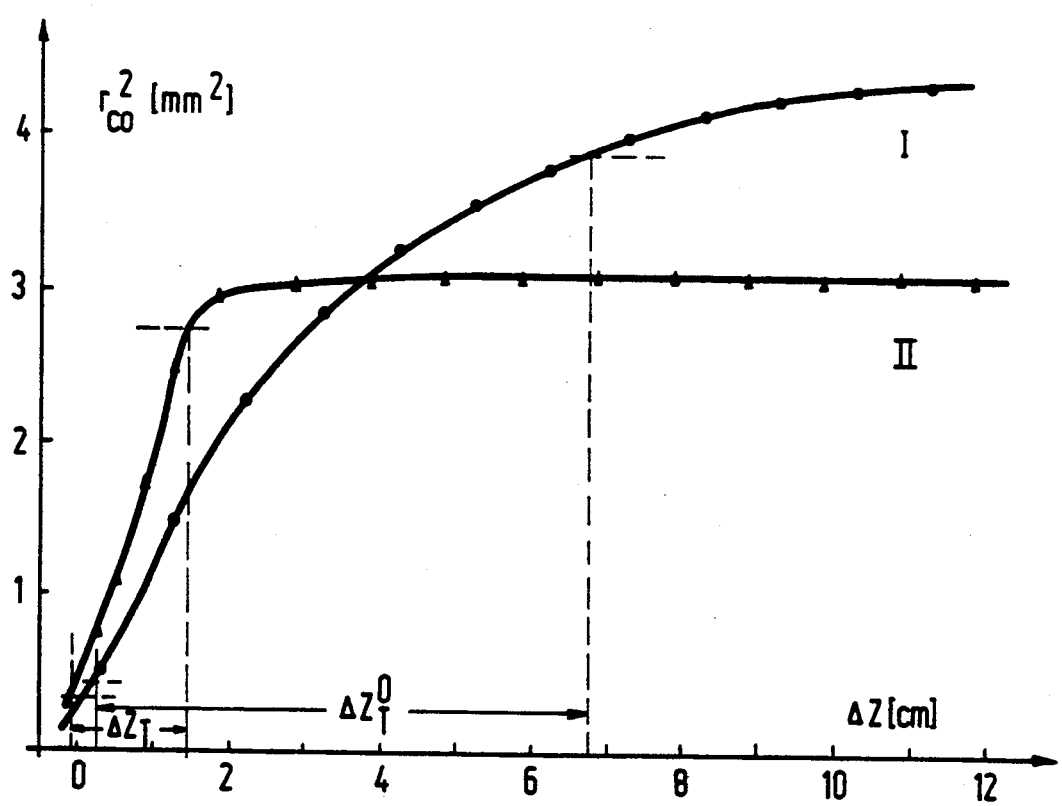
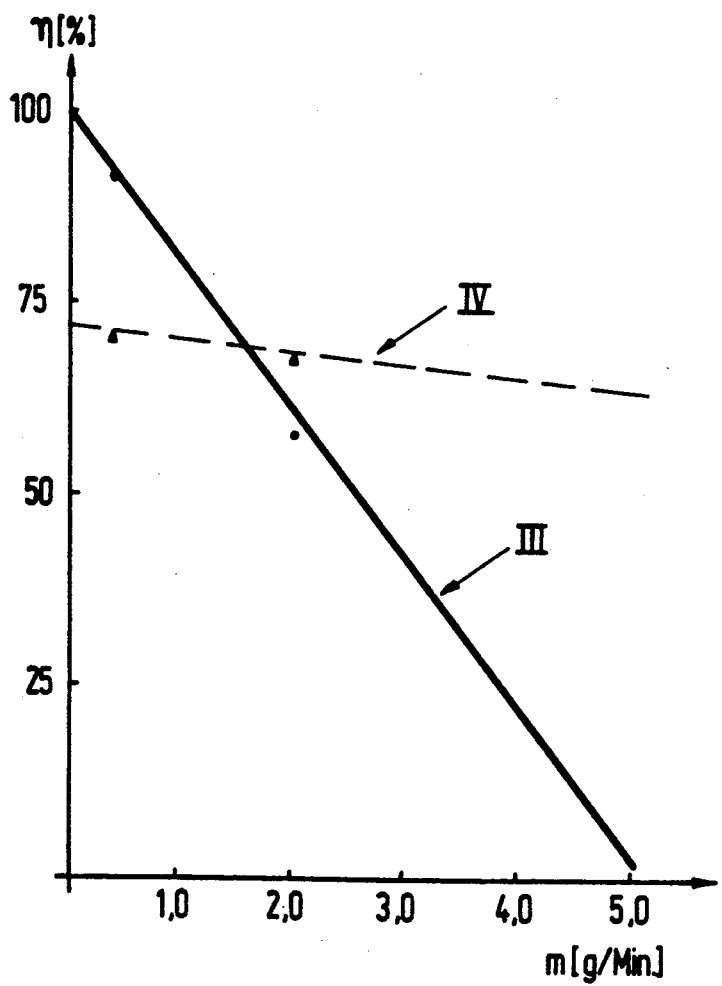
FIG.1
FIG.2

METHOD OF MANUFACTURING OPTICAL FIBRES

This is a continuation of application Ser. No. 528,289, filed Apr. 25, 1990, now abandoned, which is a continuation of Ser. No. 206,557, filed Jun. 14, 1988, now abandoned.

FIELD OF THE INVENTION

The invention relates to a method of manufacturing optical fibers, in which glass is deposited in layers on the inner wall of a glass tube which is heated to a temperature between 1100° and 1300° C., and simultaneously on a glass rod which is arranged inside the glass tube, by leading a reactive gas mixture through the glass tube at a pressure between 1 and 30 hPa, while inside the glass tube a plasma is made to reciprocate strokewise between two reversal points, after which the glass tube is made to collapse following the deposition of a quantity of glass, which corresponds to the intended construction of the optical fiber, so as to form a solid preform from which optical fibers are drawn.

BACKGROUND OF THE INVENTION

A glass tube and a glass rod are to be understood to mean herein a substrate tube or tube to be coated and a rod, which consist of synthetically manufactured amorphous silica or of amorphous silica manufactured from quartz crystals by melting (fused silica, quartz glass) with the tube material optionally being doped, or which consist of both synthetically manufactured amorphous silica and of amorphous silica manufactured from quartz crystals by melting (fused silica, quartz glass), with the tube material optionally being doped. The deposited glass consists of synthetically manufactured amorphous silica which is possibly doped.

The manufacture of optical fibers or optical waveguides according to the above-mentioned method is known from, inter alia, U.S. Pat. Nos. Re. 30,635 and 4,314,833, the version in which the glass is simultaneously deposited on a glass rod which is arranged inside the glass tube, being known from U.S. Pat. No. Re. 30,635. The present method of manufacturing except for said version in practice is referred to as "nonisothermal plasma-CVD method" (nonisothermal PCVD method, in which P=plasma and CVD=chemical vapor deposition=reactive deposition from the gas phase). In this method, glass layers are directly deposited from the gas phase on the inner wall of the glass tube (heterogeneous reaction). In this way, the formation of glass soot in the gas phase is avoided. This is described in more detail, in particular, in U.S. Pat. No. 4,314,833.

Using the PCVD method, graded index fibers as well as stepped index fibers or fibers having another refractive index profile can be manufactured, with quantities of glass being deposited which correspond to the relevant fiber construction.

The PCVD method is distinguished by its deposition yields of almost 100% and the high uniformity of the deposited glass layers along the deposition zone. However, when the total gas flow exceeds a certain value, for example, because higher deposition rates are required, deviations from the uniformity of the layers along the tube axis occur which make further processing of the starting and end regions of the coated glass tube into optical fibers impossible. Such regions are called tapers. They cause a loss of yield.

It is disclosed in DE-OS 34 45 239 (which corresponds substantially to U.S. Pat. No. 4,741,747 which is commonly assigned herewith) and DE-OS 35 25 979 that by slowing down and accelerating the plasma movement and/or by changing the microwave power supplied in the front portion of the taper, the part of the coated tube suitable for further processing can be enlarged. Both measures have in common that for reasons of process requirements a reduction of the geometrical taper leads to the formation of optical tapers. In this respect, a geometrical taper is to be understood to mean a change in the coating thickness per unit of length and an optical taper is to be understood to mean a change in the refractive index profile along the tube.

SUMMARY OF THE INVENTION

An object of the invention is to increase the yield of the PCVD method by reducing the geometrical taper without optical tapers being formed.

This object is achieved according to the invention in that in a method of manufacturing optical fibers in which glass is deposited in layers on the inner wall of a glass tube which is heated to a temperature between 1100° and 1300° C. and simultaneously on a glass rod which is arranged inside the tube, by leading a reactive gas mixture through the tube while reciprocating a plasma strokewise between two reversal points, wherein a glass rod having a circular cross-section is selected, the glass rod being arranged so that its longitudinal axis coincides with the longitudinal axis of the glass tube, the radius of the glass rod being adjusted to at most 0.67 times and at least 0.2 times the inner radius of the glass tube, and the glass rod being removed from the glass tube upon completion of the glass deposition process.

The ratio of the radius $R_o$ of the glass rod to the inner radius $R_i$ of the glass tube, stated hereinbefore, means, expressed differently, that the said ratio meet the equation $$5 R_o \geq R_i \geq 1.5 R_o \qquad (1)$$

To further increase the yield of the method, it should be aimed at a reduction of the geometrical and optical taper, in particular when the deposition rates are increased to values exceeding 0.5 g/minute, because the increase of the taper length is approximately proportional to the increase of the deposition rate. Experiments have shown that the yield of the method can be increased by the use of tube/rod combinations, if the rate of flow of the reactive gases, measured in sccm, is adjusted to at least 35 times the overall coating length, measured in cm. Sccm is to be understood to mean herein cubic centimeter per minute, under standard conditions (273K, 1013 hPa).

The above-stated ratio of the flow rate $Q_T$ to the coating length L means, expressed differently, that for the values stated, the equation is as follows:

$$\frac{Q_T}{sc\,cm} \geq 35 \frac{L}{cm} \qquad (2)$$

Typically, the coating length L is between 30 cm and 200 cm. In the case of gas compounds, which are characteristic of the PCVD method, and a coating length of 100 cm, equation (2) corresponds to a deposition rate m of from more than approximately 1g/minute to approximately 2 g/minute, whereas $$\frac{Q_T}{sc\ cm} = 2000 \frac{m}{g/minute} \quad (3)$$

The possibility of producing a low-pressure plasma in the substrate tube by means of a microwave resonator is not adversely affected by the presence of a glass rod in the tube. Rather, a deposition of doped or undoped quartz glass takes place both on the inner wall of the substrate tube and on the periphery of the rod present inside the tube.

In order to bring about the deposition, a reactive gas mixture of $O_2$, $SiCl_4$ and gaseous dopants such as, for example, $GeCl_4$ or $C_2F_6$ are led through the tube/rod combination at a pressure between 500 and 2500 Pa, while in the glass-free inner space between the tube and the rod a plasma is reciprocated periodically between two reversal points. During the coating process, the tube/rod combination is heated to a temperature between 1300° and 1600° K.

After glass has been deposited in layers in this way and according to the intended optical fiber construction, the rod is removed from the substrate tube and the tube is made to collapse to obtain a solid preform from which an optical fiber is drawn.

Using the inventive method, fibers of any desired refractive index-gradient can be manufactured, for example, graded-index and stepped index fibers having radially symmetrical refractive index profiles or profiles having a predetermined angle-dependence of the refractive index.

The reduction of the taper by means of the invented tube/rod combination has the advantage relative to other methods of taper reduction that all PCVD-process parameters remain unchanged, for example, a position-dependent change of the rate of motion of the plasma or of the plasma power is not necessary. This has the advantage that in the method according to the invention no additional optical taper is formed.

However, the advantageous application of the invention is not limited to the cases in which an increased overall yield of the method is attained. The tube/rod combination is also advantageous when, for example, the total coating length cannot be increased for reasons relating to the equipment, and yet a useful preform length, which is as large as possible, is required or desired.

BRIEF DESCRIPTION OF THE DRAWING

The invention will now be explained in greater detail by means of examples and with reference to a drawing, in which FIG. 1 is a diagrammatical representation of optical measurements on preforms, and FIG. 2 is a diagrammatical representation of the overall yield of the method as a function of the deposition rate.

DETAILED DESCRIPTION OF THE PREFERRED EMBODIMENTS

In all examples, preforms having a stepped-index profile were manufactured by means of the PCVD method. The resonator velocity amounted to 12 cm/s over a stroke length of 80 cm. Near the reversal points the velocity of the resonator was reduced to nil over a length of approximately 1 cm and was increased again to 12 cm/s in the opposite direction. The ratio of the $O_2$ flow to the chloride flow ($SiCl_4$ and $GeCl_4$) was 5:1. During the deposition process the pressure was adjusted to 1800 Pa and the substrate temperature was 1500° K. After the deposition process the preforms were collapsed and were measured in regard of the geometry of the deposited material (radius $r_{co}$ of the deposited quartz glass as a function of the preform coordinate $\Delta Z$; FIG. 1) and the refractive index difference between the deposited material and the $SiO_2$ substrate tube.

EXAMPLE 1

At an overall rate of flow $Q_T$ of 800 sccm, a microwave power of 600W, a deposition rate m of 0.3 g/minute, and using a substrate tube having an inside diameter of 15 mm, PCVD deposition results in a geometrical initial taper $\Delta Z_T^\circ$ of 6.75 cm (FIG. 1, curve 1) at a yield $\eta$ in the plateau of 100%. A second experiment under the same conditions of deposition, using a quartz glass rod having a diameter of 5 mm which was arranged in the substrate tube resulted in a taper $\Delta Z_T$ of 1.5 cm and a yield $\eta$ of 72% (FIG. 1, curve II). In both experiments it was found that the refractive index difference between the deposited material and the substrate tube was independent of the position along the preform. Owing to the step according to the invention the taper was reduced by 77%.

EXAMPLE 2

At an overall rate of flow $Q_T$ of 4200 sccm, a microwave power of 3.8 kW, a coating length of 80 cm, a deposition rate m of 2 g/minute, and using a substrate tube having an inside diameter of 22 mm, PCVD deposition results in a geometrical initial taper of 34 cm at a yield in the plateau region of approximately 100%. Under the same conditions of deposition and a rod (having a diameter of 7 mm) being arranged in the substrate tube, a geometrical initial taper of approximately 7 cm is obtained and a yield in the plateau region of approximately 74%. Thus, the use of the quartz glass rod results in a reduction of the taper by 80% and the overall yield $\eta$ of the deposition process is increased from approximately 58% to 68%. FIG. 2 is a diagrammatic representation of the process yield $\eta$ as a function of the deposition rate m, wherein the straight line III corresponds to the results without using a rod, and the straight line IV corresponds to the results using a rod ($R_i/R_o=3$). FIG. 2 clearly shows that the inventive use of a quartz glass rod becomes more advantageous as the deposition rate increases.

What is claimed is:

1. A method of manufacturing an optical fiber, comprising providing a glass tube having an inner tube wall and having a central longitudinal axis, arranging a solid glass rod having a central longitudinal axis inside the glass tube, depositing glass from a gas phase by the nonisothermal PCVD method of plasma chemical vapor deposition without the formation of glass soot in the gas phase, the glass being deposited in layers (a) on the inner wall of the glass tube which is heated to a temperature between 1100° and 1300° C., and (b) simultaneously on the solid glass rod which is arranged inside the glass tube, by passing a reactive gas mixture at a pressure between 1 and 30 hPa, through the glass tube while inside the glass tube a plasma is made to reciprocate strokewise between two reversal points, collapsing the glass tube following the deposition of the glass layers to thereby form a solid preform; and drawing the solid preform into an optical fiber; wherein said rod is a solid glass rod having a circular cross-section over the entire length of the rod, the solid glass rod being arranged so that its longitudinal central axis coincides with the longitudinal central axis of the glass tube, the radius of the glass rod being uniform over the entire length of the rod and at most 0.67 times and at least 0.2 times the radius from the central axis of the glass tube to the inner wall of the glass tube, and wherein the glass rod is removed from the glass tube upon completion of the glass deposition process whereby there is obtained a reduction in geometrical taper of the preform when compared to the geometrical taper of the preform which would be present when the solid glass rod is not present during said deposition.

2. The method as claimed in claim 1 wherein the glass deposition rate for said step of depositing glass exceeds 0.5 g/minute.

* * * * *